United States Patent [19]

Takeda

[11] 4,313,653
[45] Feb. 2, 1982

[54] CONTROLLER FOR LAPPING PHOTOGRAPHY OF CINECAMERA

[75] Inventor: Kuniharu Takeda, Chino, Japan

[73] Assignee: Kabushiki Kaisha Sankyo Seiki Seisakusho, Nagano, Japan

[21] Appl. No.: 74,697

[22] Filed: Sep. 12, 1979

[30] Foreign Application Priority Data

Sep. 13, 1978 [JP] Japan ............................. 53-112810

[51] Int. Cl.³ ............................................ G03B 21/36
[52] U.S. Cl. ................................................. 352/91 C
[58] Field of Search ................ 352/91 R, 91 C, 91 S, 352/217

[56] References Cited

U.S. PATENT DOCUMENTS 3,966,312 6/1976 Wagensonner et al. .......... 352/91 C

*Primary Examiner*—Monroe H. Hayes
*Attorney, Agent, or Firm*—James C. Wray

[57] ABSTRACT

Controller for the lapping, fade out and fade in photography of a cinecamera, in which a diaphragm is slowly stopped down partially, photography is interrupted, and the diaphragm is further rapidly stopped down to its full stroke with the shutter being shut off. The film is rewound a predetermined amount with shutter and diaphragm under that condition. The diaphragm is then rapidly opened with the shutter being shut off to effect the stand-by operation so that the fade-in photography may be started.

4 Claims, 8 Drawing Figures

CONTROLLER FOR LAPPING PHOTOGRAPHY OF CINECAMERA

BACKGROUND OF THE INVENTION

The present invention relates to a controller for the lapping photography of a cinecamera.

In the controller for lapping photography according to the prior art, the diaphragm aperture or shutter angle is gradually reduced to a zero position, where the photography is interrupted to rewind the film. Then, the diaphragm aperture or shutter angle is gradually increased so that the double exposure for fade-out and fade-in photographies is effected. This technical concept is disclosed, e.g., in U.S. Pat. Nos. 3,966,312 and 3,972,607 and D.O.S. Nos. 2,362,506, 2,460,675 and 2,512,519.

In the prior art technique, the diaphragm aperture control system is used more frequently than the shutter angle control system because the former requires no special shutter. However, the diaphragm aperture control system is accompanied by the problems that the number of the frames of the film used for the fade-out and fade-in photographies becomes so different as to make the desired lapping effects difficult and that the film itself is wasted to a considerable extent. In the practical viewpoints, more specifically, in case the brightness is different for the fade-out and fade-in photographies, the lapping effects are remarkably reduced. On the other hand, in case the fade-out photography is performed until the diaphragm is stopped down to its full stroke, the number of the frames of the film to be used for that photography is so increased that the film is accordingly wasted.

SUMMARY OF THE INVENTION

It is therefore an object of the present invention to provide a controller for the lapping photography of a cinecamera, in which with a view to establishing a proper shutter speed in accordance with the progress of the operating mode such as the overlap, fade-in or fade-out photography both the control signals generated in accordance with the progress of the operating mode and the signals generated by a light receiving detector means are so effectively used that the shutter speed of the previous shot may be maintained until the detector means generates the signals indicative of the arrival at a preset exposure level when the control signals are returned to their initial condition.

Another object of the present invention is to provide a controller of the above type, in which with a view to automatically establishing a proper shutter speed in accordance with the operating mode in various photographic modes such as fade-in, fade-out or overlap photography there is provided a gate circuit for selecting the drive frequency of a stepping motor for driving a diaphragm control mechanism from a plurality of frequencies divided from an original oscillation frequency so that the above operating mode may be digitally controlled.

A further object of the present invention is to provide a controller of the above type, in which a delay circuit for generating no output unless its input signals continue for a preset time period is connected between the light receiving detector means and a motor control circuit so that noises of a short pulse width may not be generated. Prominent effects can be obtained especially for a logic circuit including a flip-flop for changing the shutter speed in accordance with the output of the light receiving detector means.

BRIEF DESCRIPTION OF THE DRAWINGS

Other objects of the present invention will become apparent from the following description made in connection with the embodiments thereof with reference to the accompanying drawings, in which.

DESCRIPTION OF THE PREFERRED EMBODIMENTS

Figure 1A:
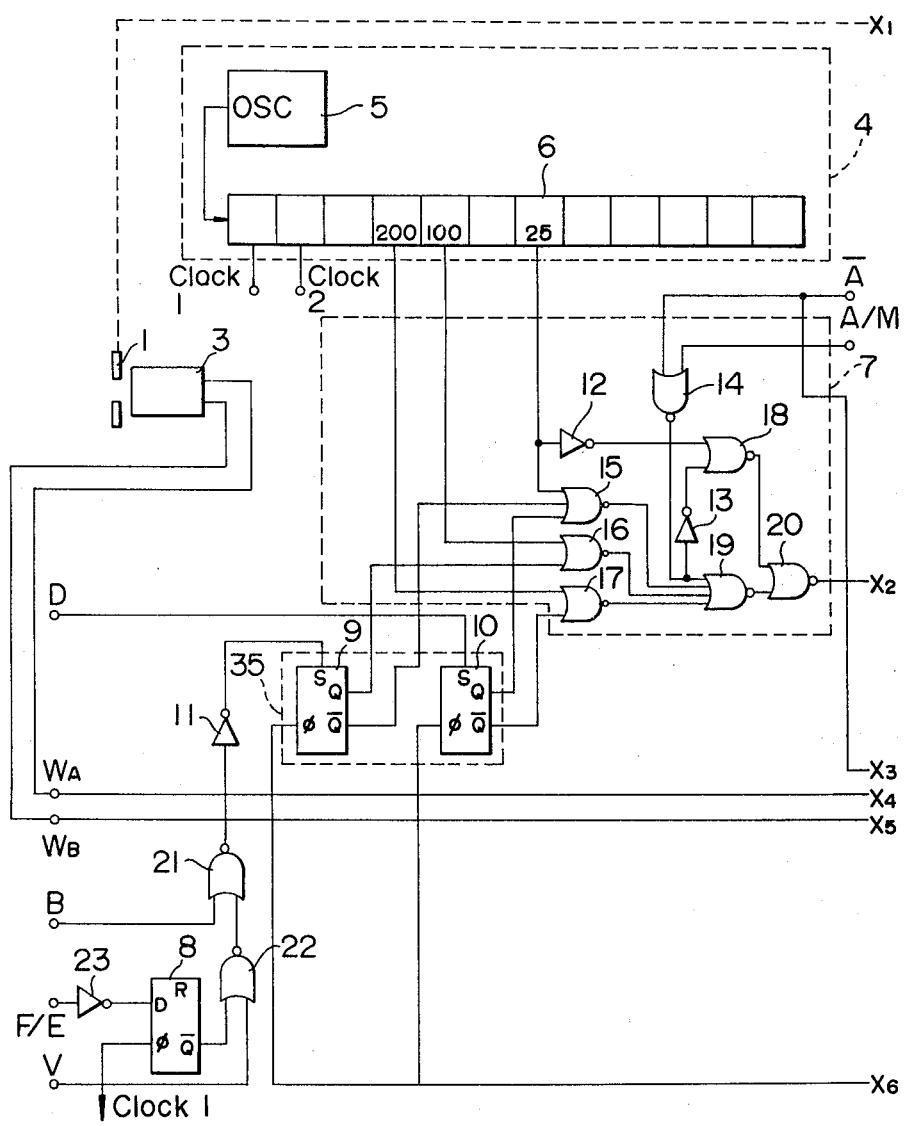
FIGS. 1(A,B) is a circuit diagram showing one embodiment of the present invention, in which $X_1$ and $X_1'$, $X_2$ and $X_2'$, $X_3$ and $X_3'$, $X_4$ and $X_4'$, $X_5$ and $X_5'$, and $X_6$ and $X_6'$ in FIGS. 1(A,B) are to be connected each other so as to show one drawing.
Figure 1B:
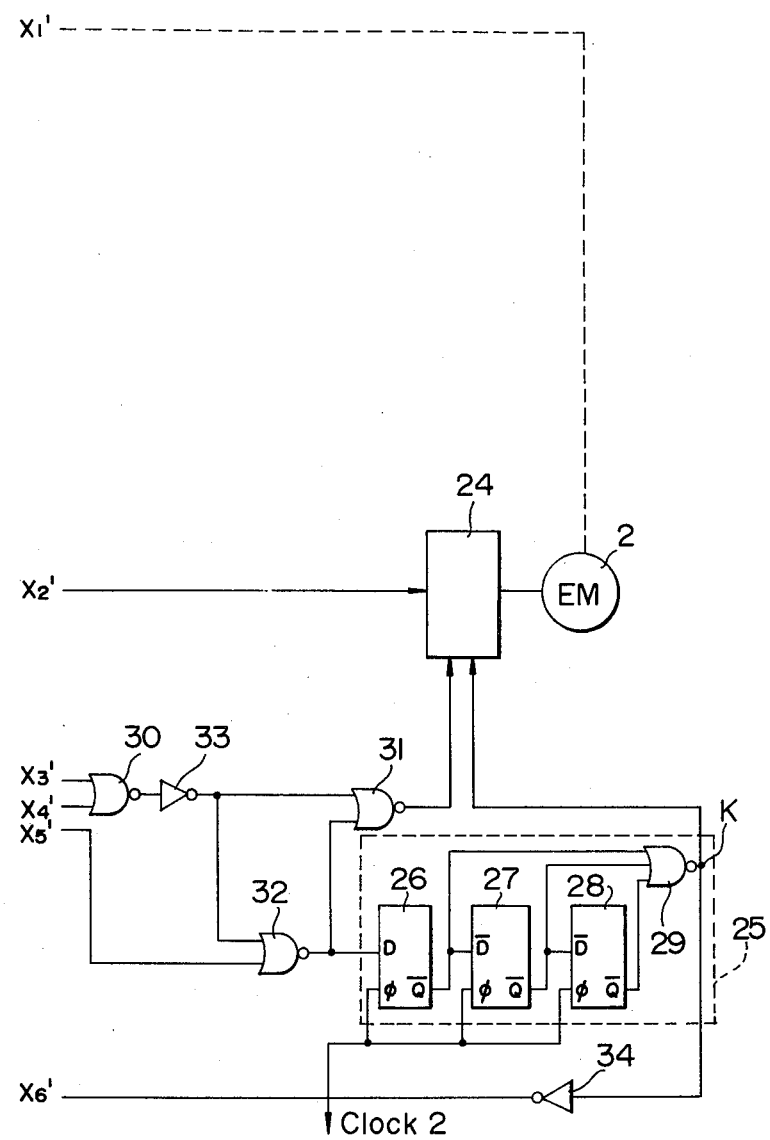

In FIG. 1 generally indicated at reference numeral 1 is a diaphragm control mechanism which is controlled by a stepping electric motor 2. At the back of the diaphragm control mechanism 1, there is arranged light receiving detector means 3 which is made operative to convert the variation in the quantity of light having passed through the diaphragm control mechanism 1 into the variation in current (or voltage).

Generally indicated at reference numeral 4 is an oscillatory circuit which is made operative to generate a plurality of pulse trains having different frequencies for turning the stepping motor 2 at different speeds. The oscillatory circuit 4 thus made is composed of a primary oscillator 5 and a frequency dividing circuit 6 for dividing the frequency generated by the oscillator 5. Incidentally, the embodiment under discussion employs the stepping motor 2, which may be replaced by a pulse motor so as to control the pulses.

Generally indicated at reference numeral 7 is a gate circuit, which is controlled by either the output of the light receiving detector means 3 or the control signals generated in accordance with the progress of the respective operating mode such as the lap or fade photography so that it may select a single pulse from the plural pulse trains of the output of the oscillatory circuit 4. Generally indicated at reference numeral 35 is a gate control circuit which is made operative to control the gate circuit 7 in response to the signals of the output of a delay circuit 25 through an inverter circuit 34.

In addition to the terminals $W_A$ and $W_B$ which are connected with the light receiving detector means 3, there are provided the V, B, D and A terminals, to which are fed the control signals generated in accordance with the respective operating mode such as the lap photography, the A/M terminal, to which are fed signals at an H level (high level) during an automatic photography and signals at an L level (low level) during a manual photography, and the F/E terminal, to which are fed the signals at the L level upon the fade photography and the signals at the H level during the lap, double exposure and EE (electric eye) modes.

There are connected, as illustrated, D flip-flop circuits 8, 9 and 10, inverters 11, 12 and 13, and NOR gates 14 to 22. Here, an inverter 23 is connected between the F/E terminal and the input terminal of the D flip-flop circuit 8. Incidentally, the terminal V takes the H level in the lap mode and the L level when a preset number of frames are photographed from the instant ⑥ of the timing chart of FIG. 2. The terminal B takes the H level in the lap mode and the L level when a release switch (not shown) is turned on at the instant ⑥ of the timing chart. The terminal D takes the H level upon completion of the fade-out photography and the L level when a preset number of frames are rewound. The terminal $\overline{A}$ takes the same levels as those of the terminal D.

The aforementioned stepping motor 2 is connected with the output terminal of the NOR gate 20 through a motor control circuit 24. D flip-flop circuits 26 to 28 and a NOR gate 29 are connected within the aforementioned delay circuit 25 in the manner, as illustrated. This delay circuit 25, the light receiving detector means 3, the gate circuit 7 and the motor control circui 24 are connected, as illustrated, by means of NOR gates 30 to 32 and inverters 33 and 34.

Figure 2:
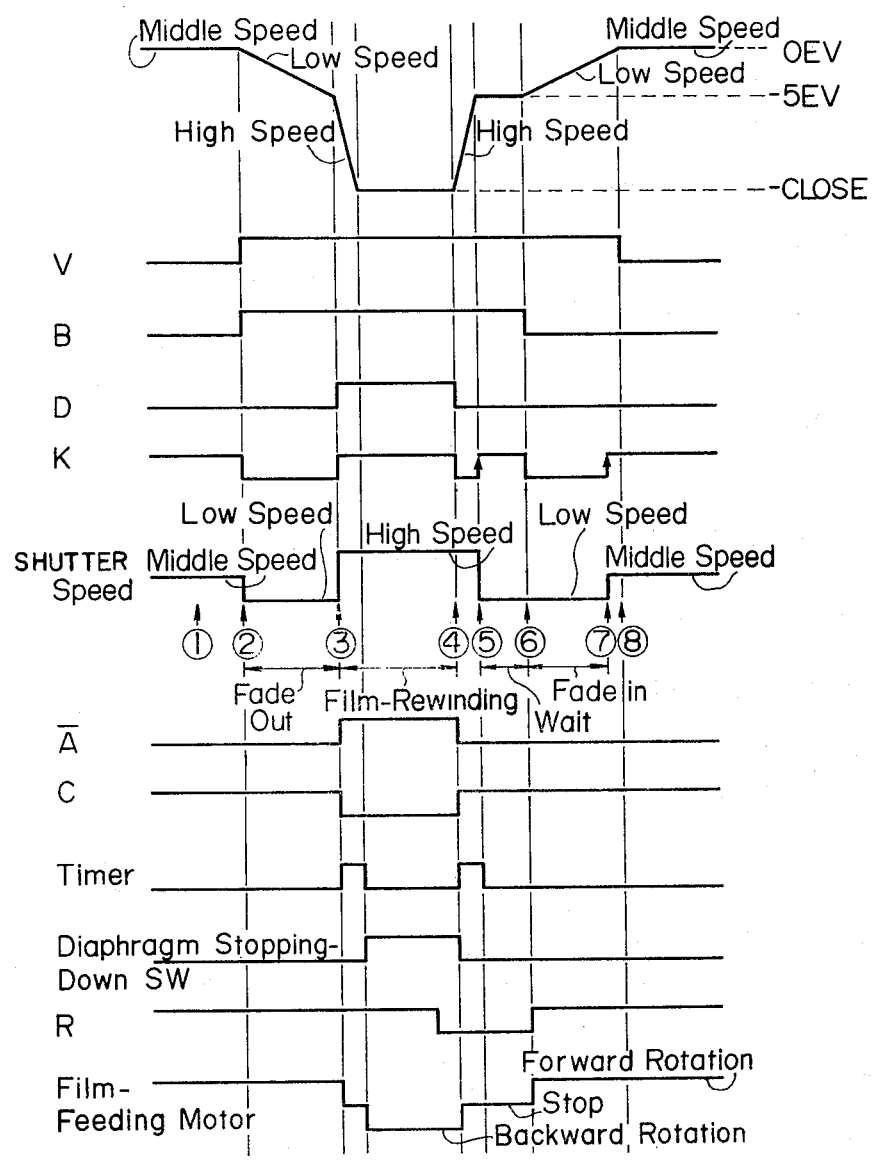
FIG. 2 is a timing chart.
Figure 3:
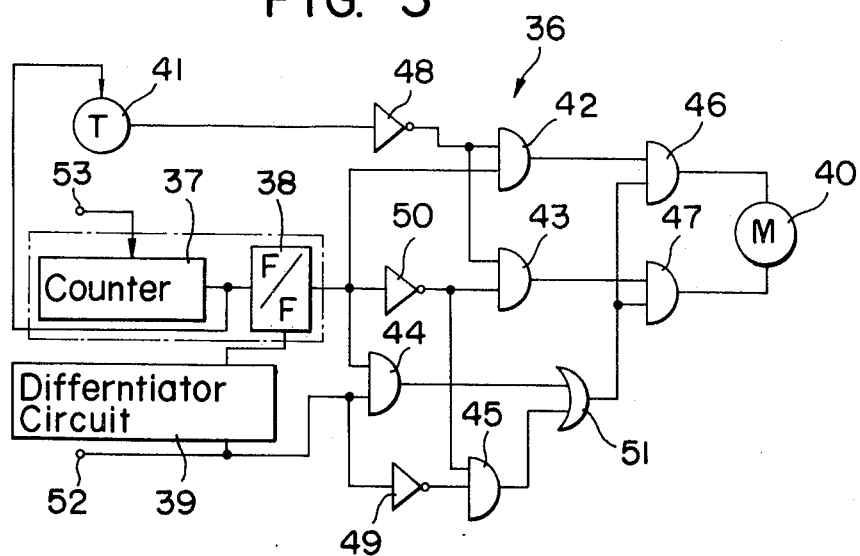
FIGS. 3 to 5 show circuits of sound systems exemplifying means for interrupting the film feeding operation at a preset film feed and for rewinding the film a preset feed after a diaphragm mechanism is stopped down to its full stroke.

FIG. 3 shows a circuit 36 exemplifying means for interrupting the film feeding operation at a preset film feed and for rewinding the film a preset feed after the diaphragm control mechanism 1 is stopped down to its full stroke. The circuit 36 is used in a sound system for simultaneously recording sounds in the film. Indicated at reference numeral 37 is a counter, which is made so operative while it is receiving the pulses of the terminal B at the H level, as shown in FIG. 2, from a terminal 53 as to generate pulses, when the film is fed a preset feed, e.g., about 80 frames by a film feeding motor 40, thereby to trigger a flip-flop 38 so that the output of the flip-flop 38 is reduced to the L level. This flip-flop 38 is triggered, when it is rendered conductive to shift the release switch to the fade-in position, by the pulses, which are prepared by differentiating the rising portion of the pulses coming from a terminal 52 with the use of a differentiator circuit 39, so that its output is reset to the H level. As better shown in FIG. 2, reference numeral 41 indicates a timer, which is made operative to generate pulses at the H level with a time delay either after the film is fed about 80 frames by the motor 40 or after the film is rewound about 80 frames by the motor. In addition, AND gates 42 to 47, a NOT gate 51 and inverters 48 to 50 are connected in the manner, as illustrated.

In the circuit thus connected, the motor 40 rotates forward (Reference should be made to FIG. 2.) under the conditions that the output C of the flip-flop 38 is at the H level, that the output of the terminal 52 of the release switch is also at the H level and that the output of the timer 41 is at the L level. On the contrary, the motor 40 rotates backward (Reference should also be made to FIG. 2.) under the conditions with the output C of the flip-flop 38, the output R of the terminal 52 of the release switch and the output timer 41 being all at the L level. Under the conditions other than the above two, the motor 40 is halted so that the motor 40 can be prevented from rotating backward under the condition having the pinch roller of a recording mechanism forced into contact with the film, thus preventing the film from being rewound and accordingly damaged.

Figure 4:
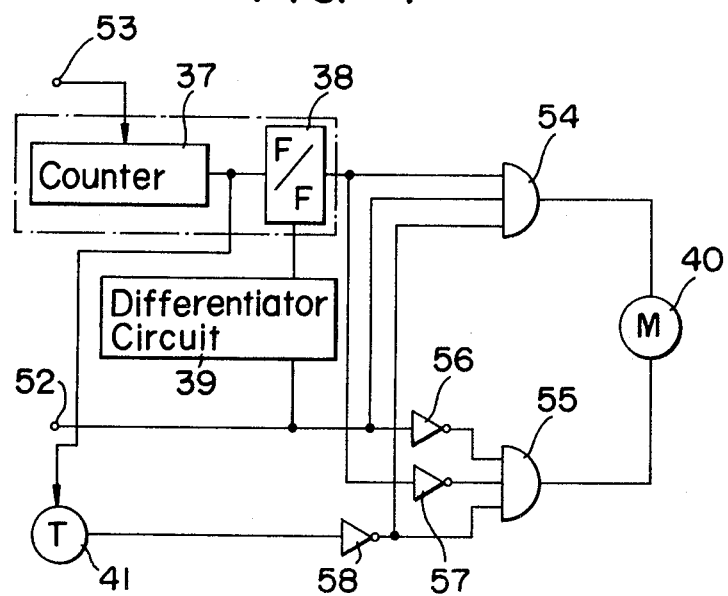

Turning to FIG. 4 showing a modification of the circuit shown in FIG. 3, AND gates 54 and 55 and inverters 56 to 58 are connected in the manner illustrated, and the operating conditions thus constituted are the same as those of the circuit of FIG. 3.

Figure 5:
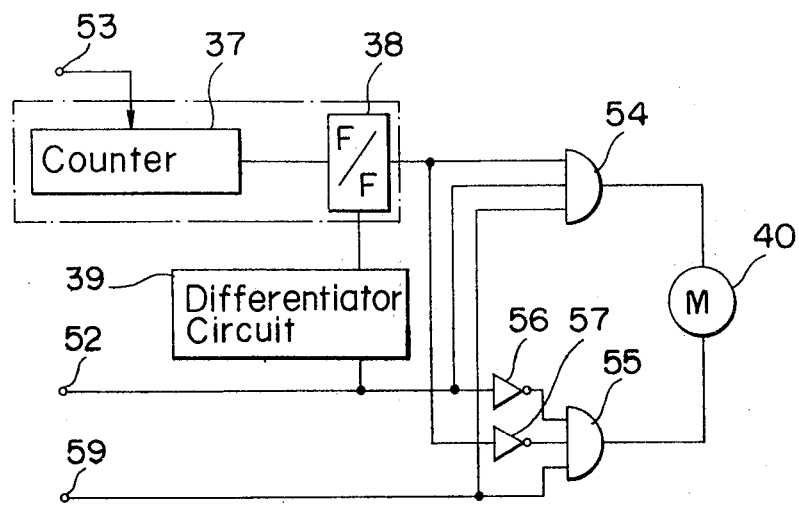

FIG. 5 shows a modification of and is different from the circuit of FIG. 4 in a point that there is connected with one input terminal of the AND gate 55 the terminal 59 of a diaphragm stop-down switch which is made operative to generate pulses at the H level under the condition where the diaphragm control mechanism 1 is stopped down to its full stroke. In the circuit thus constituted, the motor 40 rotates forward under the conditions with the output C of the flip-flop 38 and the output R of the terminal 52 being both at the H level and the output of the terminal 59 being at the L level and rotates backward under the conditions with the output C of the flip-flop 38 and the output R of the terminal 52 being both at the L level and the output of the terminal 59 being at the H level. Under the conditions other than the above two, the motor 40 is held under its halted condition so that the damage of the film by the pinch roller can be prevented (Reference should be made to FIG. 2.).

Figure 6:
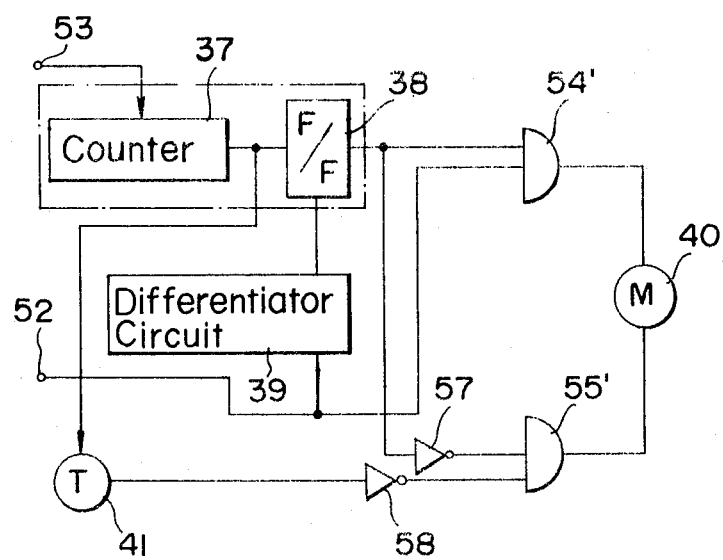
FIGS. 6 and 7 show circuits of silent systems exemplifying means for interrupting the film feeding operation at a preset film feed and for rewinding the film a preset feed after a diaphragm mechanism is stopped down to its full stroke.

A circuit shown in FIG. 6 is used in a silent system for recording no sound in the film. In this circuit, the inverter 56 of FIG. 4 is dispensed with, and AND gates 54' and 55' and the inverters 57 and 58 are connected in the manner illustrated. In the circuit thus connected, since the pinch roller of the recording mechanism is not forced into contact with the film, the motor 40 is made to rotate backward, too, even in case the output C of the flip-flop 38 and the output of the timer 41 are at the L level and the output R of the terminal 52 is at the H level in addition to the conditions described in connection with FIG. 4.

Figure 7:
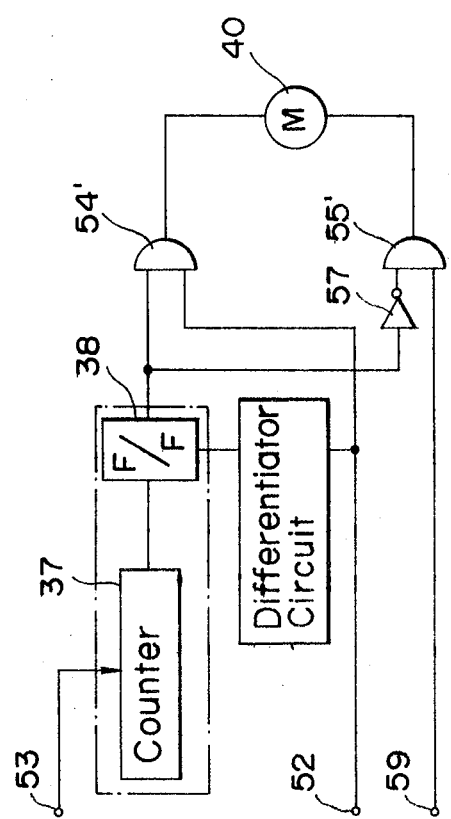

A circuit shown in FIG. 7 is also used in the silent system, in which the inverter 56 of FIG. 5 is always dispensed with and in which the AND gates 54' and 55' and the inverter 57 are connected, as illustrated. In the circuit thus connected, the motor 40 is made to rotate backward, too, under the conditions with the output C of the flip-flop 38 being at the L level and both the output R of the terminal 52 and the output of the terminal 59 being at the H level in addition to the conditions described in connection with FIG. 5.

The operations of the controller thus constituted will be described in the following. Incidentally, the controlling manner of the motor 40 will be described in connection with the circuit shown in FIG. 3.

(A) Lap Mode (or the so-called Overlap Photography)

The operations to be performed by a cinecamera are explained with reference to FIG. 2. For normal photography, specifically, the shutter speed is at its middle level. If the f-number immediately before the lap mode is preset to take 0 eV, the shutter speed takes its low level, when the lap mode is to be effected, so that the f-number is reduced from 0 eV to −5 eV (if necessary, to −7 eV). When a preset number of frames are advanced, the shutter speed is changed to its high level so that the diaphragm is fully closed in an abrupt manner, and the film is rewound a preset number of frames after a preset time elapses.

When the film is rewound, the diaphragm is opened at a high speed until the f-number takes −5 eV, at which the shutter speed is changed to its low level so that the stand-by of the cinecamera is continued until the photography of the next scene. When this photography is started, the f-number is changed at a low speed from −5 eV to 0 eV for the brightness at that time. When the f-number of 0 eV is reached, the shutter speed restores its middle level.

The operations thus far described will be explained with reference to FIG. 1. Here, let it be assumed that the terminal A/M and the terminal F/E is at the H level. First of all, since the terminal D is at the L level at the instant ① in the timing chart of FIG. 2, the output Q of the D flip-flop 10 takes its L level. On the other hand, the terminals B and V are at their L level, and the output $\overline{Q}$ of the D flip-flop 8 takes its H level because the terminal F/E is at its H level so that the output of the NOR gate 21 takes its H level and that the output Q of the D flip-flop 9 takes its L level. As a result, the NOR gates 15 and 17 are inhibited by the outputs of the D flip-flops 9 and 10, and the NOR gate 18 is also inhibited by the output of the NOR gate 14 so that only the frequency of 100 Hz from the frequency dividing circuit 6 is allowed to pass through the NOR gates 16, 19 and 20 and is fed to a motor control circuit 24 thereby to turn the stepping motor 2 at a middle speed.

Upon the start of the lapping operation (at the instant ② of FIG. 2), the terminals V and B take their H level so that the output of the NOR gate 21 takes its L level whereas the output Q of the D flip-flop 9 takes its H level. Here, the output of the D flip-flop 10 maintains its previous condition. As a result, the NOR gates 16 and 17 are inhibited so that only the frequency of 25 Hz from the frequency dividing circuit 6 is allowed to pass through the NOR gates 19 and 20 and is fed to the motor control circuit 24 thereby to turn the stepping motor 2 at a low speed. Under this particular condition, the motor 40 rotates forward to continue the film feed.

When the film is fed a preset number of frames (e.g., about 80 frames) (at the instant ③ of FIG. 2), the terminal D takes its H level. Then, the output Q of the D flip-flop 10 also takes its H level. As a result, the NOR gates 15 and 16 are inhibited so that only the frequency of 200 Hz is fed through the NOR gates 19 and 20 to the motor control circuit 24. On the other hand, when the film is fed the preset number of frames, the signals at the H level are fed to the terminal $\overline{A}$ so that the output of the NOR gate 30 takes its L level. As a result, the output of the NOR gate 31 takes its L level independently of the output of the light receiving detector means 3 so that the command of rotations in the fully closing direction is fed to the motor control circuit 24. This results in the full stop-down of the diaphragm control mechanism 1 at a high speed. Under this condition, in the circuit shown in FIG. 3, the flip-flop 38 is at its L level whereas the terminal 52 and the timer 41 are at their H level so that the motor 40 is kept halted to advance no film. Under the same condition, the shutter is shut off.

After a preset time lapse from the rise of the terminal D, i.e., when the output of the timer 41 takes its L level, the outputs of the flip-flop 38, the terminal 52 and the timer 41 are all at their L level, the motor 40 rotates backward to rewind the film a preset number of frames (e.g., about 80 frames) so that the terminal D takes its L level at the end of the rewinding operation (at the instant ④ of FIG. 2). At this instant, the terminal S of the D flip-flop 10 takes its L level but this condition is continued until the input terminal $\phi$ receives clock signals. As a result, the speed is left at a high level.

When, on the other hand, the film is rewound a preset number of frames (at the instant ④ of FIG. 2), the signals at the L level are fed to the terminal $\overline{A}$ so that the NOR gate 30 is released from its inhibited condition. Since, at this time, the exposure level of the light receiving detector means 3 is left at a level of −5 eV so that the diaphragm control mechanism 1 is under its full closed condition, the detector means 3 has its terminal $W_A$ generating the signals at the L level and its other terminal $W_B$ generating the signals at the H level. These signals of the terminals $W_A$ and $W_B$ are fed as the signals at the H level (i.e., the stop releasing command) to the motor control circuit 24 from the NOR gate 31 so that the diaphragm control mechanism 1 is opened toward −5 eV. Under this particular condition, since the flip-flop 38 is at its L level whereas the terminal 52 and the timer 41 are at their H level, the motor 40 is under its halted condition to feed no film.

When the light receiving detector means 3 detects that the diaphragm control mechanism 1 is opened up to −5 eV so that the delay circuit 25, which will be detailed later, generates (at the instant ⑤ of FIG. 2) such rising clocks as are shown at K in the timing chart of FIG. 2, the terminal $\phi$ of the D flip-flop 10 receives the breaking signals, which are inverted by the inverter 34, the flip-flop 10 is triggered to invert its output so that the output Q is changed to its L level. As a result, the NOR gates 16,17 are inhibited so that only the frequency of 25 Hz is fed through the NOR gates 14, 19 and 20 to the motor control circuit 24.

When the photography of the next scene is started (at the instant ⑥ of FIG. 2), the terminal B takes its L level, and the D flip-flop 9 holds its previous condition until its terminal $\phi$ receives the clocks. When the light receiving detector means 3 detects that the diaphragm control mechanism 1 takes 0 eV, such rising clocks are generated (at the instant ⑦ of FIG. 2) as are shown at K in the timing chart. In response to these clock signals, the output Q of the D flip-flop 9 takes its L level. As a result, the NOR gates 15 and 17 are inhibited so that only the frequency of 100 Hz is fed through the NOR gates 16, 19 and 20 to the motor control circuit 24.

When a preset number of frames (e.g., about 80 frames) are photographed (at the instant ⑧ in the timing chart) from the instant ⑥ in the timing chart, the terminal V takes its L level so that the reset signals at the end of the lap mode are generated in the system after a preset delay time.

The following descriptions are concerned with not only the operations by the time the control signals K are generated at the output terminals $W_A$ and $W_B$ of the light receiving detector means 3 but also the GO-STOP commands and the directive commands to the motor control circuit 24.

Here, the light receiving detector means 3 is preset to generate the L level signals at both of the terminals $W_A$ and $W_B$, when the f-number of the diaphragm control mechanism 1 is at a desired level; the H level signals at the terminal $W_A$ and the L level signals at the terminal $W_B$, when the mechanism 1 has to be stopped down more; and the L level signals at the terminal $W_A$ and the H level signals at the terminal $W_B$ when the mechanism 1 has to be opened more.

First of all, with the terminals $W_A$ and $W_B$ being at the H and L levels, respectively, the output of the NOR gate 31 takes its L level so that the rotational commands to the stepping motor 2 in the stopping direction are fed to the motor control circuit 24. On the other hand, the output of the NOR gate 32 takes its L level so that the delay circuit 25, which will be detailed later, generates the L level signals as its output signals K. If these signals K are at their L level, the GO command is fed to the motor control circuit 24.

Likewise, in case the terminal $W_A$ is at its L level whereas the terminal $W_B$ is at its H level, the signals at the H level are generated from the NOR gate 31 so that the rotational command in the diaphragm opening direction is generated. Here, the output signals K are at the L level.

When both of the terminals $W_A$ and $W_B$ take their L level, the output of the NOR gate 32 is raised to the H level so that the output signals K take their H level with such a delay time as is determined by the delay circuit 25. Here, the reason for the provision of the delay circuit 25 will be explained in the following.

More specifically, when a preset level of exposure is changed while the system is being operating at each of the operating modes including the lap and fade modes, short pulses may be instantly generated from the light receiving detector means 3. In response to the resultant pulses, the gate circuit controlling the shutter speed may effect an erroneous operation. In other words, the output of the light receiving detector means 3 is fed to the clock terminals $\phi$ of the D type flip-flops 9 and 10 of the gate circuit. As a result, if the aforementioned short pulses or noises are generated, the D flip-flops 9 and 10 invert their conditions so that the logic condition of the gate circuit is accordingly changed. Thus, generation of the output is inhibited by the delay circuit 25 so long as the output of the NOR gate 32 is not continued for a preset time period. This delay time is preset at a suitable value taking the operating speed of the system into consideration.

The reason for the provision of the latch or gate control circuit 35 will also be explained in the following.

For instance, in case the lap mode shown in FIG. 2 is being effected, the signals from the system are generated at the instants ②, ③, ④ and ⑥ so that the shutter speed has to be changed to a suitable value in response to those signals. In this instance, there arises no problem from the fact that the shutter speed is changed in the first half of the aforementioned mode in response to the signals generated at the instants ② and ③. However, if the shutter speed is changed in the second half of the mode in response to the signals generated at the instants ④ and ⑥, this change is deteriorative to the functions and operations of the lap mode. As a result, the shutter speed is held at its previous value by the action of the latch circuit 35 until the signals indicative of the fact that the f-number reaches the preset value for the next shot are generated so that it may be changed to a new value in response to those signals (i.e., the rise of the signals K).

(B) Fade Mode

This mode is used for the fade-in and fade-out photographies. In this mode, the shutter speed is preset at a low level while the fade-in or fade-out photography is being performed. The terminals V, B and D are preset at their L level during the fade mode. When the terminal F/E is at its H level, the shutter speed is selected to a middle level in a similar manner to that in the aforementioned lap mode.

When the terminal F/E is then made to take its L level (at the beginning of the fade operation), the output signal $\overline{Q}$ of the D flip-flop 8 take the L level as well as the output of the NOR gate 21 so that the output signal Q of the D flip-flop 9 take the H level. As a result, the NOR gates 16 and 17 are inhibited so that only the frequency of 25 Hz is fed through the NOR gates 15, 19 and 20.

(C) Manual Mode

Since the terminal A/M is made to take its L level, the terminal $\overline{A}$ also takes its L level so that the output of the NOR gate 14 takes its H level. As a result, the NOR gate 19 is inhibited so that the frequency of 25 Hz is fed through the NOR gates 18 and 20 thereby to set the stepping motor 2 at its low speed. Thus, the diaphragm control mechanism 1 can be opened and stopped down to a desired f-number by an operator independently of the output of the light receiving detector means 3.

When, in this mode, the double exposure is performed, the signals at the H level are impressed upon the terminal $\overline{A}$ when the film is fed a preset number of frames (i.e., at the instant ③ of FIG. 2). As a result, the output of the NOR gate 30 is lowered to its L level independently of the output of the light receiving detector means 3 so that the rotational commands in the full stop-down direction are fed to the motor control circuit 24. Since, on the other hand, the output of the NOR gate 14 takes its L level, the NOR gate 18 is released from its inhibited condition. As a result, the motor control circuit 24 is supplied with the frequency of 200 Hz at the instant ③ in the timing chart of FIG. 2 so that the stepping motor 2 stops down the diaphragm control mechanism 1 in the fully closed direction at a high speed.

Thus, if the double exposure is performed in the manual mode, the desired exposure level can be manually preset upon the first exposure level presetting operation so that the diaphragm can be stopped down in the fully closed direction at a high shutter speed when the preset feed of the film is finished. Upon the second exposure level presetting operation, moreover, the desired exposure level can be manually preset.

Since the controller according to the present invention is constructed in the manner thus far described, the material range of the lap can be effectively preset so that the film can be prevented from being wasted while being left unexposed. Moreover, the lap is so ensured that the picture frame can be free from being out of register. As a result, the resultant picture becomes easy to see with the advantage of the lapping effects.

In the exposure control mechanism of a cinecamera, still moreover, a proper shutter speed can be established in accordance with the progress of the operating mode such as the overlap, fade-in or fade-out mode. More specifically, both the control signals generated in accordance with the progress of the modes and the signals generated by the light receiving detector means are so effectively used that the previous shutter speed can be held, when the control signals are to restore their initial condition, until the light receiving detector means generates the signals indicative of the fact that the preset exposure level is reached.

Still moreover, both the control signals generated in accordance with the progress of the modes and the signals generated by the light receiving detector means are so effectively used that the proper shutter speed can also be established even at the second half of the operating mode.

What is claimed is:

1. A controller for the lapping photography of a cinecamera, comprising: means for changing the detected level of the quantity of light of an EE (electric eye) mechanism in response to lap signals; means for stopping down a diaphragm to the detected level of the quantity of light, at which a prime mover is interchanged at a constant speed; means for interrupting the feed of film at a preset feed and for rewinding the film a preset feed after the diaphragm is stopped down to its full stroke; means made operative, after the operations of the stop-down means and the interrupting means, to stop down the diaphragm to its full stroke at a high speed; and means for opening the diaphragm after the film rewinding operation to the detected level of the changed quantity of light at a high speed, a diaphragm control mechanism adapted to be controlled by a stepping motor; light receiving detector means for detecting the quantity of light having passed through said diaphragm control mechanism; an oscillatory circuit for generating a plurality of repeated pulse trains having different frequencies to turn said stepping motor at different speeds; a gate circuit for selecting one of the plural pulse trains generated by said oscillatory circuit; a gate control circuit for generating frequency selecting signals in said gate circuit in response to the control signals, which are generated in accordance with the progress of the operating mode such as lap or fade photography, and for holding the signals having the selected frequency, even if said control signals are varied when they are to restore their initial condition, until said detector means generates the signals indicative of the fact that the preset exposure level is reached; and a motor control circuit for driving said stepping motor in response to the output of said gate control circuit.

2. An exposure control mechanism for a cinecamera according to claim 1, wherein the light receiving detector means generates logic signals in response to the detected quantity of light having passed through said diaphragm control mechanism and the motor control circuit is adapted to be controlled by the output of said light receiving detector means; and further comprising a delay circuit connected between said light receiving detector means and said motor control circuit for generating no output unless the output of said light receiving detector means is continued for a preset time period.

3. An exposure control mechanism for a cinecamera according to claim 1, wherein the gate circuit is adapted to be further controlled by the output of said light receiving detector means to select one of the plural pulse trains generated by said oscillatory circuit.

4. An exposure control mechanism for a cinecamera according to claim 3, wherein the oscillatory circuit for generating the plural repeated pulse trains having the different frequencies to turn said stepping motor at the different speeds includes a primary oscillator and a frequency dividing circuit.

* * * * *